June 2, 1970            J. B. FARR            3,515,109

SOLID STATE IGNITION WITH AUTOMATIC TIMING ADVANCE

Filed May 15, 1968            2 Sheets-Sheet 1

INVENTOR
JAMES B. FARR

BY *Barnes, Kisselle, Raisch & Choate*

ATTORNEYS

INVENTOR
JAMES B. FARR

BY *Barnes, Kisselle, Raisch & Choate*

ATTORNEYS

United States Patent Office 3,515,109
Patented June 2, 1970

3,515,109
SOLID STATE IGNITION WITH AUTOMATIC TIMING ADVANCE
James B. Farr, Ann Arbor, Mich., assignor to Tecumseh Products Company, Tecumseh, Mich., a corporation of Michigan
Filed May 15, 1968, Ser. No. 729,276
Int. Cl. F02p 1/00
U.S. Cl. 123—148                27 Claims

ABSTRACT OF THE DISCLOSURE

An ignition circuit of the capacitor discharge type having a silicon controlled rectifier to discharge the storage capacitor and having an automatic timing advance for triggering the rectifier. At engine cranking speeds the rectifier is gated on in response to a lagging positive pulse at a desired retarded engine timing and at running speeds the rectifier is gated on in response to a leading negative pulse at a desired advanced ignition timing. The negative pulse is rendered effective only at running speeds by a capacitor connected in the triggering circuit.

---

In a capacitor discharge ignition system, timing of the capacitor discharge can be advanced between cranking and running speeds in response to a timing signal containing two consecutive pulses. The consecutive timing pulses may be developed by a rotating magnet and either two separate coils or a single coil. Although such circuits can provide effective automatic spark advance, there is always a need to improve the reliability of ignition circuits and reduce manufacturing costs, particularly with ignition circuits used on single cylinder engines where competition is severe. Additionally it is desirable to provide improved temperature stability to compensate for variations in the rectifier characteristics with temperature.

Hence a primary object of the present invention is to provide an improved capacitor discharge ignition system, and more particularly an improved automatic timing advance circuit for capacitor discharge ignition circuits.

Further objects of the present invention are to provide an automatic timing advance circuit that is rugged, dependable, reliable, and can be produced at low cost; that achieves an effective shift in engine timing from an optimum timing for starting at cranking speeds to an effective timing at running speeds; and that is particularly suited to ignition systems for single cylinder engines that are mass produced at the lowest possible cost.

Other objects, features and advantages of the present invention will be apparent in connection with the following description, the appended claims and the accompanying drawings in which:

Figure 1:
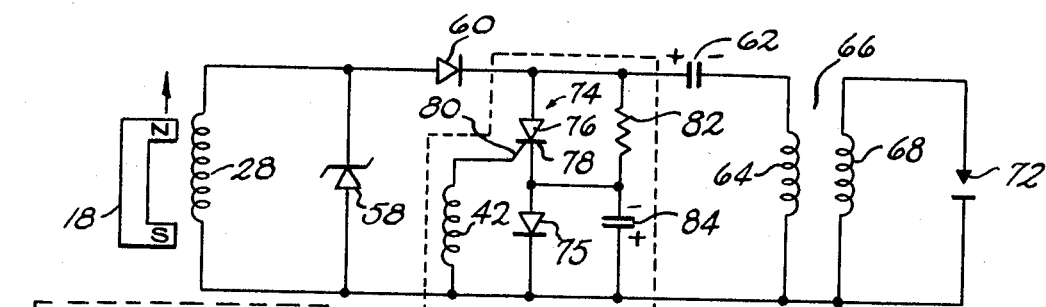
FIG. 1 is a circuit diagram of a solid state capacitor discharge ignition system incorporating automatic timing advance of the present invention.
Figure 2:
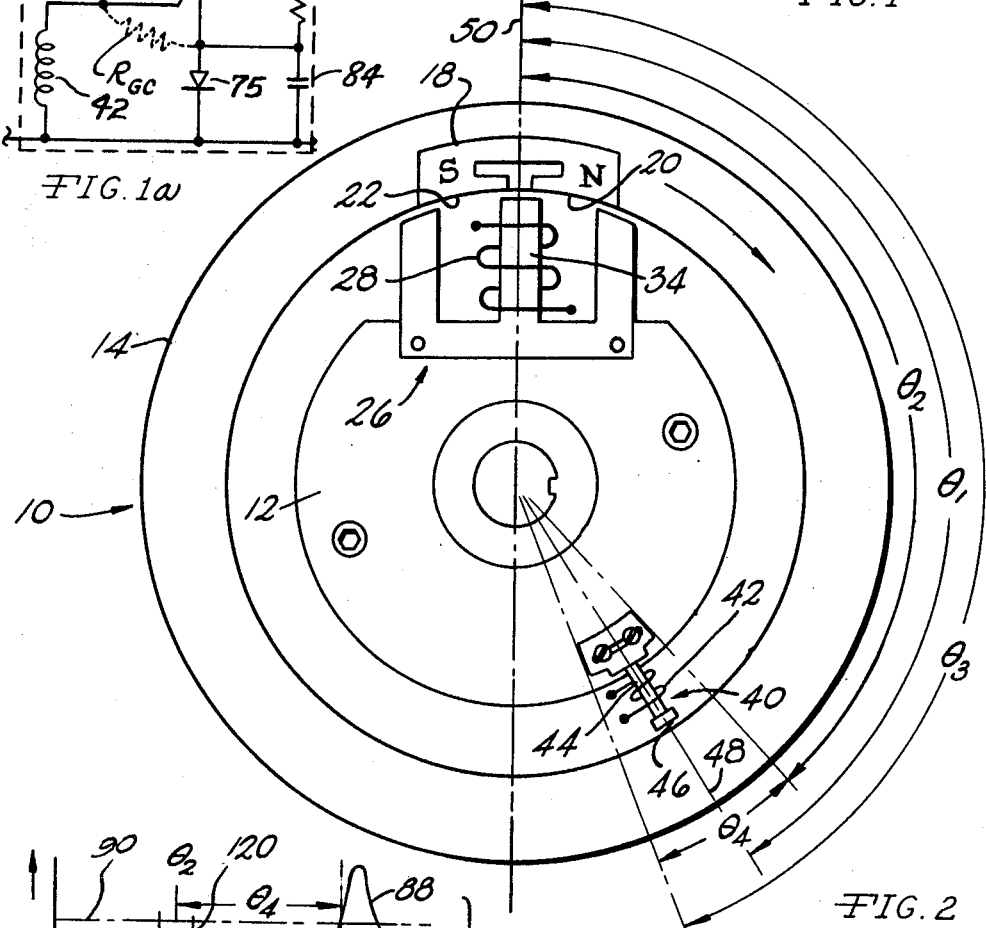
FIG. 2 is a view diagrammatically illustrating a magneto having a main charging coil and a single trigger coil for use with the ignition circuit of FIG. 1.

Referring more particularly to FIGS. 1 and 2, an ignition system is illustrated as comprising a magneto designated generally at 10 and having a stator 12 and a rotor 14 which is drivingly connected to the crankshaft (not shown) of a single cylinder engine to rotate in a clockwise direction as viewed in FIG. 1 in synchronism with the engine. A permanent magnet 18 embedded in rotor 14 has a north pole face 20 and a south pole face 22 that extend circumferentially along the inner periphery of rotor 14 with a narrow gap therebetween. Stator 12 is fastened on the engine by suitable means and is stationary relative to rotor 14. Mounted on stator 12 is a main charging coil assembly 26 which includes a charging coil 28 wound on the center leg of an E-shaped core 34. A trigger coil assembly 40 is mounted on stator 12 in spaced relation to the main charging coil 28.

The trigger coil assembly 40 comprises a coil 42 wound on a core 44 which is adjustably mounted on stator 12 with the radially outer end spaced from rotor 14 to form an air gap 46 with magnet 18. For purposes of explanation, the axis 48 of coil 42 is disposed at an angle $\theta_1$ referenced to the axis 50 of coil 28. It will be apparent that an angular displacement such as $R_1$ may also be considered as representing crankshaft angles and also time. In general, the location or crankshaft angle $\theta_1$ of the trigger coil assembly 40 is correlated to the engine cycle to provide an advanced ignition timing at a crankshaft angle $\theta_2$ when the engine is running and a retarded ignition timing at a crankshaft angle $\theta_3$ when the engine is cranked during starting.

Figure 1A:
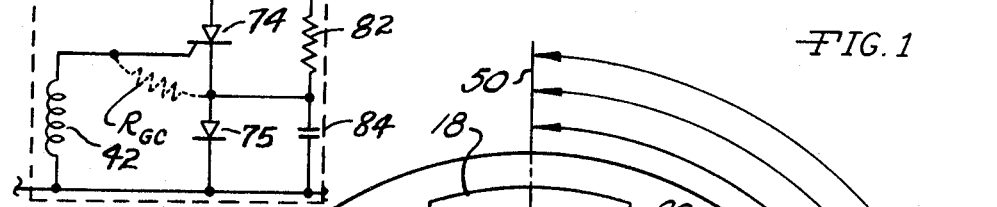
FIG. 1a illustrates a portion of the ignition circuit of FIG. 1 depicting the internal gate-cathode resistance of a silicon controlled rectifier which is used in one embodiment of the present invention.

Referring more particularly to the circuit of FIG. 1, a Zener diode 58 is connected directly across coil 28 to regulate the maximum positive voltage generated in coil 28 when the upper terminal as viewed in FIG. 1 is positive. Also connected across the charging coil 28 is a series circuit comprising a silicon diode 60, a capacitor 62 and the primary winding 64 of an ignition transformer 66. A secondary winding 68 of transformer 66 is connected directly across a spark plug 72. A silicon controlled rectifier 74 is connected in series with a silicon diode 75 directly across capacitor 62 and winding 64. Rectifier 74 has an anode 76, a cathode 78 and a gate 80. In the embodiment illustrated in FIGS. 1 and 1a, rectifier 74 has an internal gate-cathode resistance shown in FIG. 1a and designated $R_{GC}$. Trigger coil 42 is connected between gate 80 and cathode 78 through diode 75. A resistor 82 is connected directly across the anode 76 and cathode 78 and a capacitor 84 is connected directly across diode 75. Resistor 82 and diode 75 provide compensation for gate-cathode junction leakage current through rectifier 74 to prevent spurious triggering of rectifier 74 due to ripple voltages generated in coil 42. Capacitor 84 provides a timing shift between retarded ignition timing, $\theta_3$, and advanced ignition timing, $\theta_2$, as will later be described. Diode 75 shunts capacitor 84 for current through rectifier 74.

Figure 3:
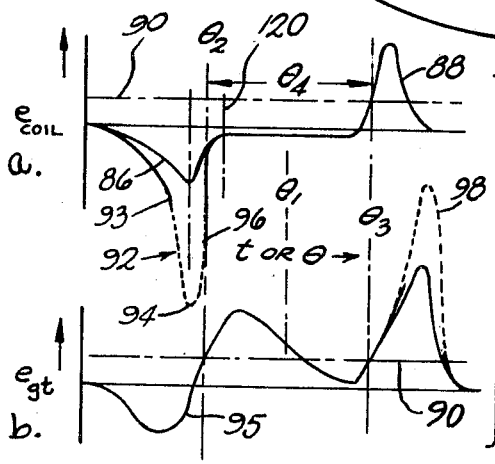
FIG. 3 is a diagram illustrating the waveforms of voltages in the triggering circuit of FIG. 1.

The operation of the ignition circuit described hereinabove can best be understood in connection with the waveforms illustrated in FIG. 2 wherein crankshaft angles, $\theta$, are plotted along the abscissa axis and voltage is plotted along the ordinate axis. The abscissa axis can also be considered as generally representing time at different scales for different engine speeds. It will be understood that the waveforms in FIG. 3 are for purposes of explanation and are not necessarily intended to be of scale. FIG. 3a shows the voltages generated in coil 42, at both cranking and running speeds, whereas FIG. 3b shows the gating voltage applied to gate 80 at running speeds.

When the engine is turned at a relatively low cranking speed during starting, the alternating voltage generated in coil 28 is rectified by diode 60 to charge capacitor 62 to the polarity indicated in FIG. 1. As magnet 18 continues to rotate in a clockwise direction as viewed in FIG. 2, the magnet sweeps past the timing coil 42 and generates an alternating signal illustrated in full lines in FIG. 3a and generally comprising a leading negative pulse 86 and a trailing positive pulse 88. A third pulse (not shown) of negative polarity will also be generated after pulse 88, but the third pulse is not used in the embodiment being described. Coil 42 is connected to gate 80 so that pulse 86 is negative when applied to gate 80. The critical gate voltage required to fire rectifier 74 is designated by the voltage level 90. The true shape of pulse 86 will be distorted somewhat from that illustrated in FIG. 3a due to leakage current through the gate-cathode resistance $R_{GC}$ and the charge on capacitor 84, but in any event, the voltage at gate 80 in response to pulse 86 is below the threshold level 90 at cranking speeds and hence does not fire rectifier 74. However, at cranking speeds the trailing positive pulse 88 has an amplitude exceeding level 90 to initiate discharge of capacitor 62 through rectifier 74. In the preferred embodiment, the duration of pulse 88 is sufficient to allow capacitor 62 to completely discharge in a damped oscillatory manner through rectifier 74 and diode 75 on one half-cycle discharge and through diodes 58, 60 on the opposite half-cycle discharge. Trigger coil assembly 40 and magnet 18 are arranged and disposed so that pulse 88 exceeds level 90 at the crankshaft angle $\theta_3$ which is correlated to the engine cycle so that the timing is at or near top dead center in the compression stroke to facilitate easy starting.

As soon as the engine starts, the magnitude of the voltages generated in coil 42 increases substantially as represented by the leading negative pulse 92 (dashed lines, FIG. 3a) being of substantially greater magnitude than pulse 86. During the initial portion 93 of pulse 92 having a negative slope, that is, as the voltage increases negatively from zero to a maximum negative voltage 94, gate 80 and cathode 78 are reversed biased. However, reverse leakage current through the gate-cathode resistance $R_{GC}$ charges capacitor 84 at the polarity designated in FIG. 1. The voltage on capacitor 84 will reach the peak value 94 of the negative pulse 92 and will be in a direction tending to forward bias gate 80. In the gate-cathode bias circuit comprising coil 42, gate 80, cathode 78 and capacitor 84, the voltage at capacitor 84 modifies the voltage generated in coil 42 so that the gate-cathode voltage at rectifier 74 has a waveform 95 illustrated in FIG. 3b. During the trailing positive slope portion 96 of pulse 92, that is, as the voltage decays from peak 94 toward zero, the voltage on capacitor 84 will cause the combined voltage at capacitor 84 and coil 42 to exceed level 90 at a crankshaft angle $\theta_2$ to thereby fire rectifier 74 and initiate discharge of capacitor 62. The arrangement and construction of the circuit components and the parameters of rectifier 74 are selected so that the combined voltages at capacitor 84 and coil 42 exceed the threshold level 90 at the desired crankshaft angle $\theta_2$ for running speeds, for example, an angle of 22° before top dead center designated by the angle $\theta_4$. It will be apparent that the amount of timing shift depends primarily on the spacing between pole faces 20, 22. Although the amplitude of the retarded ignition pulse 98 is also increased substantially at running speeds, the retarded pulse is ineffective since capacitor 62 is substantially fully discharged in response to pulse 92.

By way of example, on engines in the 2.5–7 h.p. range a typical cranking speed is in the range of 300–400 r.p.m. with minimum cranking speeds of 100–150 r.p.m. and a typical idle speed is above 1500 r.p.m. The circuit is designed to provide a timing shift in the speed range of 800–1000 r.p.m. The timing shift provides easy starting at cranking speeds and acceptable engine performance at all running speeds. The discharge time constant for capacitor 84 (via resistor 82 and the gate-cathode resistance $R_{GC}$) is such that capacitor 84 has little or no effect on the retarded ignition pulse 88 at cranking speeds. By way of further example, typical silicon controlled rectifiers may have an internal gate-cathode resistance, $R_{GC}$, on the order of 100 ohms and a critical threshold voltage of 0.5 volt. Typically capacitor 84 might have a voltage on the order of 2–3 volts at running speeds.

Figures 4A, 4B:
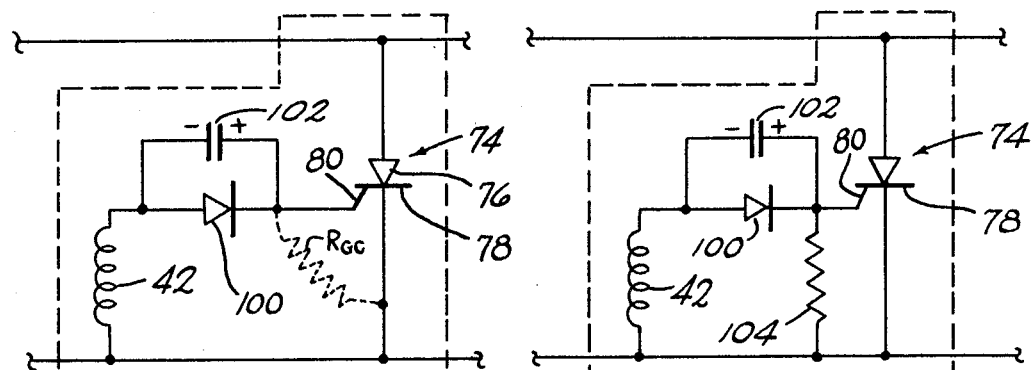
FIGS. 4a and 4b are circuit diagrams illustrating two different, but somewhat similar, modifications in the triggering circuit of FIG. 1.

Referring to the embodiment of FIG. 4a, except for the triggering circuit for rectifier 74 (enclosed in dashed lines in FIGS. 1 and 4a) the remainder of the ignition circuit is the same as that shown in FIG. 1 and like components are designated by like reference numerals. In FIG. 4a, a rectifier 100 is connected directly between gate 80 and the upper terminal of coil 42. Rectifier 100 is poled so as to conduct in a forward direction corresponding to a forward bias on gate 80. A capacitor 102 is connected directly across rectifier 100. Cathode 78 is connected to the lower terminal of coil 42. In this embodiment, at cranking speeds the retarded ignition timing pulse 88 is coupled through rectifier 100 to gate 80 to initiate discharge of capacitor 62 at the crankshaft angle $\theta_3$ in substantially the same manner as described in connection with FIGS. 1–3. At running speeds, capacitor 102 is charged to the polarity designated in FIG. 4a via the gate-cathode resistance $R_{GC}$ during the leading portion 93 of the advanced ignition timing pulse 92. Conduction through rectifier 100 is blocked during the negative pulse 92. As pulse 92 falls off along the lagging portion 96, the charge on capacitor 102 will fire the rectifier 74 at the crankshaft angle $\theta_2$ as described in connection with FIGS. 1–3. For certain applications, the triggering circuit of FIG. 4a has a desirable advantage over that of FIG. 1 in that rectifier 100 does not carry high current during discharge of capacitor 62 and hence diode 100 may be a less expensive component than diode 75 in FIG. 1.

FIG. 4b illustrates a modification of the triggering circuit of FIG. 4a wherein like components are designated by like numerals and wherein the charging circuit for capacitor 102 includes a resistor 104 external of the rectifier 74 and connected directly across the gate 80 and cathode 78 of the rectifier. The operation of the circuit of FIG. 4b is substantially the same as that described in connection with FIGS. 1–3 and 4a except that during running speeds capacitor 102 is charged through resistor 104. Certain types of silicon controlled rectifiers do not have an internal gate-cathode resistance compatible with the time constant requirements for capacitor 102 to provide the timing shift required. Moreover, certain silicon controlled rectifiers have essentially no, or at least a very small, internal gate-cathode resistance $R_{GC}$ and the gate-cathode current would burn up the rectifier if an external resistor such as resistor 104 were not provided.

Figure 5:
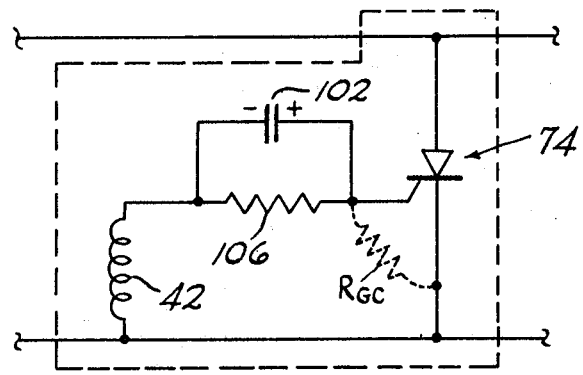
FIG. 5 is a circuit diagram illustrating a further modification of the triggering circuit.

FIG. 5 illustrates a modification of the triggering circuit of FIG. 4a wherein like components are designated by like numerals and wherein rectifier 100 (FIG. 4a) is replaced by a resistor 106 (FIG. 5) connected directly between the gate 80 and the upper terminal of coil 42. The operation of the embodiment illustrated in FIG. 5 is essentially the same as that described hereinabove. At low cranking speeds during starting the retarded ignition timing pulse 88 (FIG. 3) is coupled to gate 80 through resistor 106 to fire rectifier 74 at the crankshaft angle $\theta_3$. The time constant of capacitor 102 and resistors 106 and $R_{GC}$ is such that the pulse 88 is essentially coupled directly to gate 80. On the other hand, the time constant coupled with the relatively low frequency and low amplitude of pulse 86 renders pulse 86 ineffective at cranking speeds. At running speeds the increased amplitude of pulse 92 causes capacitor 102 to be charged during the initial leading portion 93 of the advanced ignition timing pulse 92 via the internal gate-cathode resistance $R_{GC}$ of rectifier 74 to a level that will fire rectifier 74 at the crankshaft angle $\theta_2$ as pulse 92 falls off along the trailing portion 96.

Figures 6, 7:
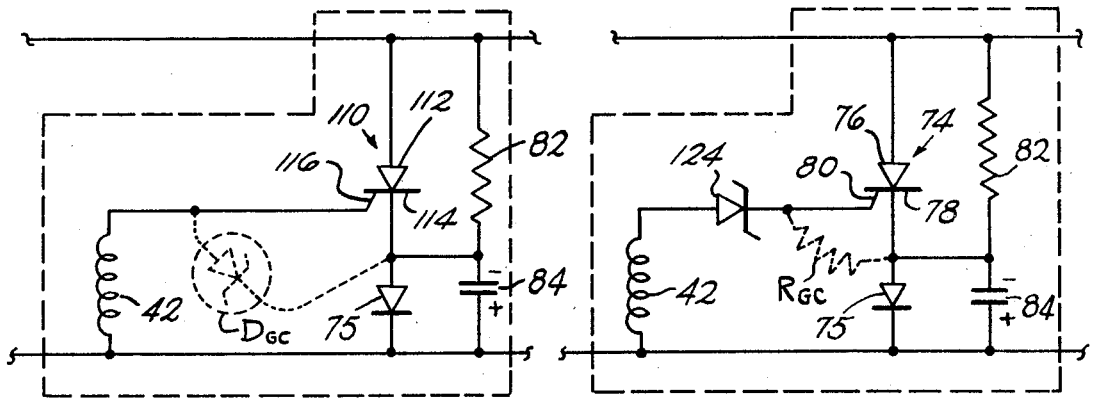
FIGS. 6 and 7 illustrate still further modifications in the triggering circuit of FIG. 1.

Referring to FIG. 6, there is illustrated a still further modification of the trigger circuit shown in FIG. 1 wherein like components are identified by like reference numerals. Rectifier 74 (FIG. 1) is replaced by a silicon controlled rectifier 110 connected in series with diode 75 which is connected across capactior 62 as in FIG. 1. Rectifier 110 has an anode 112, a cathode 114 and a gate electrode 116. Coil 42 is connected across gate 116 and cathode 114 through the parallel connected diode 75 and capacitor 84. Rectifier 110 is of the type commonly known as a "sensitive gate" silicon controlled rectifier wherein little or no gate-cathode resistance is provided internally of the rectifier. With this type of rectifier there is little resistance to gate-cathode current in the forward direction, i.e., when gate 116 is positive. When gate 116 is reversed biased (biased negatively) the gate-cathode characteristics resemble those of a Zener diode. As the voltage at gate 116 increases negatively from zero, reverse leakage current through the gate 116 is relatively small and remains essentialy constant until the reverse gate voltage reaches a critical breakdown potential at which point an avalanche breakdown occurs and so the reverse gate-cathode current increases substantially for a small change in gate voltage. Since the gate-cathode characteristics of rectifier 110 resemble those of a Zener diode, the internal gate-cathode characteristics of rectifier 110 are illustrated by the Zener diode $D_{GC}$ shown in phantom connected directly across gate 116 and cathode 114.

The mode of operation of the triggering circuit shown in FIG. 6 achieved by proper selection of the components of the triggering circuit and the characteristics of rectifier 110 are slightly different from that discolsed hereinabove in connection with FIGS. 1–5. At cranking speeds during starting the retarded ignition timing pulse corresponding to pulse 88 in FIG. 3 is coupled directly to the gate 116 and rectifier 110 fires at the desired crankshaft angle $\theta_3$. At cranking speeds the voltage generated in coil 42 during the leading negative pulse corresponding to pulse 86 in FIG. 3 is insufficient to cause reverse breakdown and hence capacitor 84 receives little, if any, charge at cranking speeds. As soon as the engine starts and the magnitude of the voltages generated in coil 42 increases substantially, the amplitude of the advanced ignition timing pulse corresponding to pulse 92 (FIG. 3) exceeds the reverse Zener breakdown potential of the gate-cathode during the initial negatively going portion of the pulse. Capacitor 84 is charged to substantially the peak negative value of the leading pulse at the polarity shown. As the amplitude of the negative pulse falls off, corresponding to the trailing portion 96 (FIG. 3), the voltage on capacitor 84 fires rectifier 110 at the desired advanced ignition timing angle $\theta_2$ in the manner described hereinabove in connection with FIG. 3. Stated differently, capacitor 84 receives no charge until the magnitude of the negative voltage pulse from coil 42 is greater than the gate-cathode Zener voltage of rectifier 110.

The circuit described hereinabove in connection with FIG. 6 has one outstanding advantage over the circuits previously described hereinabove in that the engine speed at which the timing is advanced to the crankshaft angle $\theta_2$ does not vary with variations in the gate-cathode trigger voltage. With the circuit of FIG. 6, the engine speed at which ignition timing is advanced to the crankshaft angle $\theta_2$ is determined primarily by the reverse breakdown voltage of gate 116 and cathode 114 ($D_{GC}$) and the air gap between coil 42 and magnet 18. In certain silicon controlled rectifiers this reverse gate-cathode Zener voltage does not change significantly with temperature and hence the engine speed at which ignition timing is advanced to the crankshaft angle $\theta_2$ is relatively independent of temperature. By comparison, the gate-cathode trigger voltage corresponding to the voltage level 90 (FIG. 3) may vary significantly with temperature. However, variations in the critical triggering voltage are insignificant compared to the voltage on capacitor 84 when reverse breakdown occurs at gate 116 and cathode 114.

By way of further illustration and not by way of limitation, in one circuit constructed according to the embodiment of FIG. 6, rectifier 110 was a type "G.E. C.106" manufactured by the General Electric Company. This particular rectifier has a reverse gate-cathode breakdown voltage of 16 volts. A timing shift was achieved at 805 r.p.m. by designing the coil assembly 40 and selecting the air gap 46 to obtain a peak negative voltage of 18 volts, corresponding to the negative peak 94 of the leading pulse 92 (FIG. 3), at 805 r.p.m. For the embodiment of FIG. 6, the number of turns in the trigger coil 42 or the area of core 44 must be much greater than the corresponding values for the other circuits described hereinabove. Although the required magnitude of the leading negative pulse is high, the shape of the voltage pulse corresponding to pulse 92 (FIG. 3) is relatively unimportant. The waveform between the negative peak 94 and the termination point 120 of the pulse 92 should drop toward zero as rapidly as possible so as to minimize any timing advance as speed is increased above the desired timing shift speed. Additionally, the waveform between the leading pulse and positive pulse should be slightly negative, but this requirement is met naturally since the flux in core 44 increases as the south pole face 22 approaches the core. The operation of the circuits described hereinabove in connection with FIGS. 1–5 is also improved by meeting these two requirements.

The temperature independent operation achieved by the circuit of FIG. 6 can also be provided using silicon controlled rectifiers of the type having an internal gate-cathode resistance $R_{GC}$ as illustrated by the embodiment of FIG. 7 wherein a Zener diode 124 is connected directly between the gate 80 and the upper terminal of coil 42. Rectifier 124 is poled to conduct in its forward direction when the upper terminal of coil 42 is positive and hence at cranking speeds the retarded ignition timing pulse, corresponding to pulse 88 (FIG. 3), will be coupled to gate 80. After the engine starts and the magnitude of the voltages generated in coil 42 increases, the leading negative pulse will have an amplitude exceeding the reverse Zener voltage of diode 124 to charge capacitor 84 through the internal gate-cathode resistance $R_{GC}$ causing rectifier 74 to trigger at the crankshaft angle $\theta_2$ desired for advanced ignition timing.

It should be understood that the solid state ignitions with automatic timing advance have been described hereinabove for purposes of illustration and are not intended to define the limits of the present invention, the scope of which is defined by the following claims.

I claim:

1. An ignition system for igniting a combustible charge in an internal combustion engine having at least one cylinder, one spark device for said cylinder and a source of electrical energy comprising circuit means adapted to transfer electrical energy from said source to said spark device at a first predetermined crankshaft angle in a timing cycle of said engine when said engine is operating at a predetermined running speed and at a second predetermined crankshaft angle in said timing cycle when said engine is cranked at a predetermined low speed during starting, said first and said second crankshaft angles having a predetermined crankshaft angle displacement therebetween, said energy transferring circuit means comprising an electron control device having a pair of main electrodes and an input electrode and responsive to an electrical signal having a predetermined amplitude and a predetermined polarity applied to said input electrode and one of said main electrodes to switch said control device to a first state of conduction thereby causing electrical energy to be transferred to said spark device, and ignition timing circuit means coupled to said input electrode and said one main electrode and operable during each engine cycle at said running speed and at said cranking speed to provide a timing signal which includes at least first and second signal pulsations having substantially the same said crankshaft angle displacement therebetween at said cranking speed and at said running speed, said second pulsation being correlated to said second crankshaft angle and having an amplitude at said predetermined polarity exceeding said predetermined amplitude at said cranking speed to thereby cause energy to be transferred from said source to said spark device at said second crankshaft angle at cranking speeds, said first pulsation being of a polarity opposite to said predetermined polarity and increasing in amplitude with increasing engine speed, and wherein said timing circuit means further comprises first circuit means responsive to one portion of said first pulsation to develop a timing shift signal and combine said timing shift signal with another portion of said first pulsation so that at running speeds said combined signal has an amplitude at said predetermined polarity that exceeds said predetermined amplitude to cause energy to be transferred from said source to said spark device at said first crankshaft angle.

2. The ignition system set forth in claim 1 wherein said timing circuit means comprises a source of timing signals and wherein said first circuit means comprises an energy storage device operatively connected in circuit with said source, said input electrode and said one main electrode to develop said timing shift signal during said one portion of said first pulsation and combine said developed timing shift signal with said other portion of said first pulsation.

3. The ignition system set forth in claim 2 wherein said storage device is a capacitor connected in a series charging circuit comprising said timing signal source, said input electrode and said one of said main electrodes of said electron control device so that charging current for said capacitor flows through an input-output electrode current path through said electron control device.

4. The ignition system set forth in claim 3 wherein said electron control devise is a controlled rectifier having gate, anode and cathode electrodes, said gate is said input electrode and said cathode is said one main electrode and wherein said timing circuit means further comprises resistance means, said series circuit comprises a gate-cathode current conducting path through said rectifier and wherein said resistance means is effectively connected across said gate and said cathode of said rectifier.

5. The ignition system set forth in claim 4 wherein said resistance means comprises internal gate-to-cathode resistance of said rectifier.

6. The ignition system set forth in claim 2 wherein said storage device is a capacitor, said first circuit means further comprises Zener diode means and wherein said capacitor is connected in a series charging circuit comprising said Zener diode means so that said capacitor is charged through said Zener diode means when said one portion of said first pulsation exceeds a reverse Zener breakdown voltage of said Zener diode means.

7. The ignition system set forth in claim 6 wherein said electron control devise is a controlled rectifier having gate, anode and cathode electrodes, said gate is said input electrode and said cathode is said one main electrode, and wherein said gate and said cathode has a reverse breakdown characteristic and said Zener diode means comprises said gate and said cathode.

8. The ignition system set forth in claim 2 wherein said first circuit means further comprises a resistor and wherein said energy storage device is a capacitor connected in parallel with said resistor.

9. The ignition system set forth in claim 2 wherein said first circuit means further comprises an asymmetrical conducting device and wherein said energy storage device is a capacitor connected in parallel with said asymmetrical conducting device.

10. The ignition system set forth in claim 1 wherein said electron control device is a controlled rectifier having gate, anode and cathode electrodes, said gate is said input electrode and said cathode is said one main electrode, and wherein said ignition timing circuit means further comprises coil means, means movable relative to said coil means and in synchronism with said engine to develop said timing signal, and a capacitor connected in a series charging circuit comprising said coil means and a gate-cathode current conducting path through said rectifier.

11. The ignition system set forth in claim 10 wherein one terminal of said coil means is connected to said gate, one terminal of said capacitor is connected to said cathode and the other terminal of said capacitor is connected to the other terminal of said coil means and wherein an asymmetrical conducting device is connected in parallel with said capacitor, said asymmetrical conducting device being poled to conduct in its forward direction anode-cathode current through said rectifier.

12. The ignition system set forth in claim 11 further comprising resistance means connected in parallel with said anode and said cathode of said rectifier and in series with said asymmetrical conducting device.

13. The ignition system set forth in claim 11 wherein said series charging circuit further comprises Zener diode means responsive to said one pulsation to charge said capacitor when said one pulsation has an amplitude exceeding a reverse breakdown voltage of said Zener diode means.

14. The ignition system set forth in claim 13 wherein said gate and cathode have a reverse breakdown characteristic, and said Zener diode means comprises said gate and said cathode.

15. The ignition system set forth in claim 10 wherein said capacitor is connected in said series charging circuit between said gate and said coil.

16. The ignition system set forth in claim 15 wherein said series charging circuit further comprises resistance means effectively connected in parallel with said gate and said cathode.

17. The ignition system set forth in claim 16 wherein said resistance means comprises internal gate-cathode resistance in a gate-cathode current conducting path through said rectifier.

18. The ignition system set forth in claim 15 further comprising a resistor connected in parallel with said capacitor, said resistor having a value correlated to a charging time constant for said capacitor to couple said second pulsation to said gate at cranking speeds and to develop said timing shift signal in response to a first portion of said first pulsation at running speeds.

19. The ignition system set forth in claim 15 wherein said timing circuit means further comprises an asymmetrical conducting device connected in parallel with said capacitor and poled in a direction to shunt said capacitor and couple said second pulsation to said gate and block said first pulsation therethrough so that said first pulsation is coupled to said gate through said capacitor.

20. An ignition system for igniting a combustible charge in an internal combustion engine having at least one cylinder, one spark device for said cylinder and a source of electrical energy comprising circuit means adapted to transfer electrical energy from said source to said spark device at a first predetermined crankshaft angle in a timing cycle of said engine when said engine is operating at a predetermined running speed and at a second predetermined crankshaft angle in said timing cycle when said engine is cranked at a predetermined low speed during starting, said energy transferring circuit means comprising an electron control device having a pair of main electrodes and an input electrode and being responsive to an electrical signal having a first predetermined amplitude and predetermined polarity applied to said input terminal and one of said main electrodes to switch said control device to a first state of conduction and thereby cause electrical energy to be transferred to said spark device, and ignition timing circuit means coupled to said input electrode and said one main electrode and operable during each engine cycle at said running speed and at said cranking speed to provide a timing signal which includes at least first and second pulses having a predetermined crankshaft angle displacement therebetween correlated to a predetermined timing shift between engine timing at said running speed and at said cranking speed, said second pulse having said predetermined polarity and having an amplitude exceeding said first predetermined amplitude at cranking speeds to thereby cause energy to be transferred from said source to said spark device at said second predetermined crankshaft angle and wherein said timing circuit means further comprises first electrical circuit means responsive to a predetermined threshold amplitude of said first pulse at running speeds to develop a timing shift signal from a first portion of said first pulse, and second circuit means for combining said timing shift signal with a second portion of said first pulse so that at running speeds said combined signal exceeds said first predetermined amplitude to cause energy to be transferred from said source to said spark device at said first predetermined crankshaft angle.

21. The ignition system set forth in claim 20 wherein said timing circuit means comprises a source of timing signals, a capacitor and Zener diode means and wherein said first and said second circuit means include a series charging circuit for said capacitor comprising said timing signal source and said Zener diode means.

22. The ignition circuit set forth in claim 21 wherein said electron control device comprises a controlled rectifier having gate, anode and cathode eletcrodes, said gate is said input electrode and said cathode is said one main electrode and wherein said Zener diode means comprises a reverse breakdown characteristic of said gate and said cathode.

23. The ignition system set forth in claim 22 wherein said series charging circuit further comprises an asymmetrical conducting device connected across said capacitor and poled to conduct in its forward direction in response to forward direction current flow through said Zener diode means.

24. The ignition system set forth in claim 23 wherein said paralleled capacitor and asymmetrical conducting device are connected in series with said anode and said cathode of said rectifier and wherein resistance means is connected across said anode and said cathode of said rectifier means in series with said asymmetrical conducting device.

25. The ignition system set forth in claim 21 wherein said timing circuit means comprises coil means and means movable relative to said coil means in synchronism with said engine to serve as a source of said timing signals and wherein said coil is connected in said series charging circuit for said capacitor.

26. In an ignition system for igniting a combustible charge in an internal combustion engine wherein a source of electrical energy is associated with said engine, the combination comprising a storage capacitor adapted to be connected to said source to charge said capacitor, an ignition transformer, and circuit means for discharging said capacitor through the primary windings of said transformer comprising timing signal source means operable in synchronism with said engine to generate a timing signal including at least first and second pulses having a time displacement therebetween correlated to a predetermined timing shift between engine timing at cranking speeds and at running speeds of said engine, said first pulse being of one polarity and said second pulse being of an opposite polarity, said first pulse further having a first portion thereof which has a rate of change in a first direction and a second portion thereof which has a rate of change in an opposite direction, an electron control device having a pair of main current conducting electrodes and an input electrode for controlling current conduction through said main electrodes, said electron control device being responsive to pulses of said other polarity exceeding said predetermined amplitude to initiate discharge of said storage capacitor, a timing capacitor, and circuit means operatively connecting said capacitor to said timing signal source and said input electrode and one of said main electrodes so that said second pulses in said timing signal are coupled to said input electrode at all engine speeds and said capacitor is charged by said first portion of said one pulse to said one polarity and the charge on said timing capacitor modifies the effect of said second portion of said first pulse at said input electrode whereby at cranking speed said electron control device is triggered in response to said second pulse and at running speeds the combined effect of said timing capacitor charge and said second portion of said first pulse initiates discharge of said capacitor through said electron control device.

27. The ignition system set forth in claim 26 wherein said timing signal source comprises a magnet and a coil movable relative to each other in synchronism with said engine and being constructed so as to generate in said coil a negative pulsation forming said first pulse and then a positive pulsation forming said second pulse, circuit means connected in parallel with said timing capacitor to couple said second pulse to said input electrode at all speeds, said second pulse being of such polarity and amplitude at all engine speeds to initiate conduction through said main current conducting path of said electron control device, said circuit means is operative in response to a negative going portion of said negative pulsation to charge said capacitor in a direction tending to render said electron control device conductive such that when the negative pulse attains a maximum negative value and then reverses its slope to a positive going direction the charge on said capacitor at running speeds is sufficient to initiate discharge of said storage capacitor through said electron control device at a time in said engine cycle displaced from a time at which discharge of said storage capacitor is initiated at said cranking speeds.

References Cited

UNITED STATES PATENTS

| | | | |
|---|---|---|---|
| 3,186,397 | 6/1965 | Loudon | 123—148 |
| 3,334,619 | 8/1967 | Penn | 123—148 |
| 3,358,665 | 12/1967 | Carmichael et al. | 123—148 |

LAURENCE M. GOODRIDGE, Primary Examiner

U.S. Cl. X.R.

123—149; 315—209